United States Patent
Childers

(10) Patent No.: US 7,672,504 B2
(45) Date of Patent: Mar. 2, 2010

(54) METHOD AND SYSTEM FOR OBTAINING HIGH RESOLUTION 3-D IMAGES OF MOVING OBJECTS BY USE OF SENSOR FUSION

(76) Inventor: Edwin M. C. Childers, 3504 Oak Glen La., San Diego, CA (US) 92117

( * ) Notice: Subject to any disclaimer, the term of this patent is extended or adjusted under 35 U.S.C. 154(b) by 770 days.

(21) Appl. No.: 11/217,229

(22) Filed: Sep. 1, 2005

(65) Prior Publication Data
US 2007/0064242 A1 Mar. 22, 2007

(51) Int. Cl.
G06K 9/00 (2006.01)
(52) U.S. Cl. .................. 382/154; 382/128; 382/107; 348/211.11
(58) Field of Classification Search .................. 382/154
See application file for complete search history.

(56) References Cited

U.S. PATENT DOCUMENTS

| Patent No. | | Date | Inventor | Ref. |
|---|---|---|---|---|
| 4,953,087 | A | 8/1990 | Crawford | |
| 5,003,166 | A * | 3/1991 | Girod | 250/201.4 |
| 5,028,949 | A * | 7/1991 | Kawano | 396/106 |
| 5,504,569 | A * | 4/1996 | Kato et al. | 356/3.11 |
| 5,852,672 | A * | 12/1998 | Lu | 382/154 |
| 5,947,225 | A * | 9/1999 | Kawakami et al. | 180/271 |
| 6,028,672 | A * | 2/2000 | Geng | 356/602 |
| 6,101,455 | A * | 8/2000 | Davis | 702/94 |
| 6,493,095 | B1 * | 12/2002 | Song et al. | 356/603 |
| 6,580,811 | B2 * | 6/2003 | Maurer et al. | 382/103 |
| 6,801,662 | B1 * | 10/2004 | Owechko et al. | 382/224 |
| 6,897,854 | B2 | 5/2005 | Cho et al. | |
| 6,944,566 | B2 | 9/2005 | Chen et al. | |
| 7,000,469 | B2 | 2/2006 | Foxlin et al. | |
| 7,047,161 | B1 * | 5/2006 | Friesel | 702/189 |
| 7,053,830 | B2 | 5/2006 | Krumm et al. | |
| 7,085,637 | B2 * | 8/2006 | Breed et al. | 701/38 |
| 7,085,639 | B2 | 8/2006 | Lu et al. | |
| 7,277,187 | B2 * | 10/2007 | Smith et al. | 356/601 |
| 7,312,924 | B2 * | 12/2007 | Trissel | 359/497 |
| 7,494,338 | B2 * | 2/2009 | Durbin et al. | 433/29 |
| 2001/0038705 | A1 * | 11/2001 | Rubbert et al. | 382/128 |
| 2002/0006217 | A1 * | 1/2002 | Rubbert et al. | 382/131 |
| 2002/0055082 | A1 * | 5/2002 | Durbin et al. | 433/29 |
| 2003/0042401 | A1 * | 3/2003 | Gartner et al. | 250/208.1 |
| 2004/0213453 | A1 * | 10/2004 | Liu et al. | 382/154 |
| 2004/0240754 | A1 * | 12/2004 | Smith et al. | 382/154 |
| 2006/0001545 | A1 * | 1/2006 | Wolf | 340/573.1 |
| 2006/0028552 | A1 | 2/2006 | Aggarwal et al. | |
| 2006/0091654 | A1 * | 5/2006 | De Mersseman et al. | 280/735 |
| 2006/0154198 | A1 * | 7/2006 | Durbin et al. | 433/29 |
| 2007/0005609 | A1 * | 1/2007 | Breed | 707/10 |
| 2007/0047079 | A1 * | 3/2007 | Trissel | 359/497 |
| 2007/0064242 | A1 * | 3/2007 | Childers | 356/601 |
| 2009/0061381 | A1 * | 3/2009 | Durbin et al. | 433/24 |

OTHER PUBLICATIONS

Davis, J., Ramamoorthi, R., Rusinkiewicz, S., "Spacetime stereo: a unifying framework for depth from triangulation", Computer Vision and Pattern Recognition, 2003. Proceedings. 2003 IEEE Computer Society Conference on, Jun. 18-20, 2003, ISBN: 0-7695-1900-8.*

* cited by examiner

Primary Examiner—Sath V Perungavoor

(57) ABSTRACT

A system to scan 3D images applies sensor fusion of a passive triangulation sensor in combination with an active triangulation sensor to obtain high resolution 3D surface models from objects undergoing arbitrary motion during the data acquisition time.

18 Claims, 4 Drawing Sheets

METHOD AND SYSTEM FOR OBTAINING HIGH RESOLUTION 3-D IMAGES OF MOVING OBJECTS BY USE OF SENSOR FUSION

This application is related to application Ser. No. 11/217,239 entitled "POLARIZING MULTIPLEXER AND METHODS FOR INTRA-ORAL SCANNING" filed commonly herewith and commonly owned, the content of which is incorporated by reference.

BACKGROUND

The present invention relates to intra-oral methods and apparatus for optically imaging a structure and creating representative 3D models for the structure.

The dental and orthodontic field is one exemplary application of digital generation of 3D models of structures. In many dental applications, a working model of a patient's teeth is needed that faithfully reproduces the patient's teeth and other dental structures, including the jaw structure. Conventionally, a three-dimensional negative model of the teeth and other dental structures is created during an impression-taking session where one or more U-shaped trays are filled with a dental impression material. The impression tray containing the impression material, in its pliant state, is introduced into the mouth of the patient. While the tray and impression material is held in place, the material cures, and after curing, the tray and material are removed from the mouth as a unit. The impression material is allowed to solidify and form an elastic composition, which is the negative mold after removal. The working model is obtained by filling this impression with a modeling material such as dental stone in its liquid state. After being poured into the impression, the dental stone sets and hardens into a solid form which when removed from the impression is a positive representation of the structure of the patient's teeth and tissue in the jaw.

Dental patients typically experience discomfort when the dentist takes an impression of the patient's teeth. The procedure can be even more uncomfortable for the patient if the impression materials run, slump or are otherwise expelled into the patient's throat. Also, shipment and storage of the models can be costly. Hence, determinations of the surface contour of teeth by non-contact optical methods and generation of digital 3D teeth models have become increasingly important.

A basic measurement principle behind 3D optical methods is triangulation. Triangulation techniques are based on known geometric techniques. Given a triangle with the baseline of the triangle composed of two optical centers and the vertex of the triangle the target, the range from the target to the optical centers can be determined based on the optical center separation and the angle from the optical centers to the target.

Triangulation methods can be divided into passive and active. Passive triangulation (also known as stereo analysis) typically utilizes ambient light and both optical centers are typically camera imagers. Active triangulation uses only a single camera imager and, in place of the other camera, uses a source of controlled illumination (also known as structured light). Stereo analysis while conceptually simple is not widely used because of the difficulty in obtaining correspondence of object surface features between camera images. Objects with well-defined edges and corners, such as blocks, may be rather easy to obtain surface feature correspondence, but objects with smoothly varying surfaces, such as skin or tooth surfaces, with no easily identifiable surface features or points to key on, present a significant challenge for the stereo analysis approach.

To overcome the correspondence issue, active triangulation, or structured light, methods project known patterns of light onto an object to infer its shape. The simplest structured light pattern is a spot, typically produced by a laser. The geometry of the setup enables the calculation by simple trigonometry of the active triangulation sensor's range from the scanned object's surface on which the light spot falls. This computed active triangulation sensor's range to the surface of the scanned object will be referred to herein as the surface range data. Typically a sequence of images is gathered with the spot of light moved to fall across different areas of the scanned object's surface and by keeping track of where the active triangulation sensor is positioned with respect to a coordinate reference frame that is fixed with respect to the object being scanned, the sequence of active sensor surface range data can be used to construct a 3D model of the object's surface. Other patterns such as a stripe, or 2-dimensional patterns such as a grid of dots can be used to decrease the required time to capture the set of active triangulation images needed to compute the surface range data for the scanned object's surface of interest.

For active triangulation methods using structured light, such as a single dot or line of light, one source of error arises from any uncertainty in the movement of the object with respect to the active sensor's camera imager while a sequence of image capture steps is underway. Such uncertainty in movement results in uncertainty at each image capture step in the relative position of the camera imager with respect to the surface of the object. This uncertainty in relative position in turn results in errors in the surface range data and the object's modeled 3D surface contour constructed from the range data. Typically, these errors are minimized by mounting the object to be scanned on a reference platform and then moving and positioning the scanner with respect to a coordinate reference frame that is fixed with respect to the reference platform. Since the object being scanned is fixed on the reference platform, the scanner's position with respect to the object is known at each step in the image capture sequence. Alternately, the scanner may be fixed on a reference platform and the object being scanned is then moved and positioned with respect to a coordinate reference frame that is fixed with respect to the reference plate. In either case, the relative position between the scanner and the object, at each image capture step of the scan, can be determined to within the tolerance of the positioning mechanism.

While this method of fixing the object (or scanner) on a platform and then moving the scanner (or object) with a mechanism that links the movement back to the coordinate reference frame of the platform can be effective, there are situations where it is difficult or impractical to fix the relative position between an object to be scanned and the scanner. For example, the intra-oral scanning of dentition can involve uncontrolled movements of the patient's teeth during a scan, which results in an uncertainty of the position of the scanner with respect to the dentition and consequential errors in the 3D models of the intra-oral structures constructed from the captured images.

SUMMARY

In one aspect, a system for scanning 3D surfaces applies fusion of image data from a passive triangulation sensor in combination with image data from an active triangulation sensor to obtain high resolution 3D surface models from objects undergoing arbitrary motion with respect to the sensors during the time that the images are being captured by both sensors.

Implementations of the method may include the following. The system allows a passive triangulation sensor that captures images of a sparse set of arbitrarily distributed fiducials on an area of an object's surface to be used in combination with a high resolution active triangulation sensor to scan objects with arbitrary motion relative to the imaging sensors and yet provide an accurate 3-D surface model of the object.

In another aspect, a method for forming 3-D surface models of an object with arbitrary motion relative to a scanning system includes capturing images of an object having a sparse set of arbitrarily distributed fiducials on its surface with a passive triangulation sensor; acquiring surface range data using an active triangulation sensor that is synchronized to capture an active triangulation image at or near the same instant in time that an image is captured by the passive triangulation sensor; using images from the passive sensor to determine the frame-to-frame relative movement of the imaged fiducials with respect to the scanner and using the frame-to-frame movement of the imaged fiducials to derive a frame-to-frame coordinate transformation of the active triangulation sensor surface range data.

Implementations of this aspect may include one or more of the following. The passive triangulation sensor can be a full field passive sensor that captures views from two or more perspectives of fiducials sparsely and arbitrarily distributed on an object's surface. The active triangulation sensor can project a light pattern bisecting the object. The pattern can be one of: a point, a line, a 2D pattern. The sensors can scan at frame rates between 2 and 1,000 frames per second. The active triangulation sensor and the passive triangulation sensor operate at the same frame rate or the active triangulation sensor can operate at a frame rate that is synchronized with the frame rate of the passive triangulation sensor. The sensors can be mounted on a fixed platform or a mobile platform. The method can include applying a plurality of fiducials on the surface of the object to use for determining frame-to-frame motion between the object and the scanner and to align the active triangulation sensor surface range data from one frame to the next to a coordinate reference frame that is fixed with respect to the object being scanned. The fiducials can be sparsely distributed on the surface of an object with less than 10,000 fiducials per square millimeter. The method can process the captured passive triangulation sensor fiducial data using an ego-motion computation technique to determine the position of the scanner with respect to the object.

In yet another aspect, an intra-oral dental scanner includes a passive triangulation sensor and an active triangulation sensor to obtain a high resolution 3D surface model from dentition and tissue undergoing arbitrary motion with respect to the sensors during the image acquisition.

Implementations of the intra-oral dental scanner can include one or more of the following. The passive triangulation sensor can be a full field passive sensor that captures images from two or more perspectives of a sparse set of arbitrarily distributed fiducials on the intra-oral dentition and tissue surfaces. The active triangulation sensor projects a light pattern bisecting the dentition and tissue surfaces, and the pattern can be one of: a point, a line, a 2D pattern. The sensors can scan at frame rates between 2 and 1,000 frames per second. The active triangulation sensor and the passive triangulation sensor can operate at the same frame rate or the active triangulation sensor can operate at a frame rate that is synchronized with the frame rate of the passive triangulation sensor. The sensors can be mounted on a fixed or mobile platform. Additionally, a plurality of fiducials can be applied on the intra-oral dentition and tissue surfaces to use for determining frame-to-frame motion between the dentition and the sensors and to align the active triangulation sensor surface range data from frame-to-frame to a coordinate reference frame that is fixed with respect to the dentition and tissue being scanned. The fiducials can be sparsely distributed on the intra-oral dentition and tissue surfaces with less than 10,000 fiducials per square millimeter. The captured passive triangulation sensor fiducial data can be processed using an ego-motion computation technique.

As a camera moves with respect to a scene being viewed by the camera, the camera's image of the scene tends to change over time. The relative movement of the camera with respect to the scene is commonly referred to as ego-motion and a number of techniques have been developed for estimating the camera's 3D ego-motion from a sequence of scene images taken by the camera. The techniques for determining camera ego-motion can be categorized as discrete time methods or as instantaneous time methods. Both ego-motion estimation methods are applicable to, and may be used by, the present invention as further described in the following detailed specification.

Advantages of the invention may include one or more of the following. The system utilizes a fusion of data from the passive triangulation sensor with the data from the active triangulation sensor to create an accurate 3D model of the scanned teeth. The system provides increased tolerance to motion between the intra-oral scanner sensors and the patient's teeth during scans while providing accurate 3D models of the teeth. The system affords the user with scan flexibility for positioning the scanner's intra-oral probe within the intra-oral cavity to image the teeth to be scanned while requiring a minimal amount of direct involvement by the user during the scan. The system also provides the patient with a comfortable experience while his or her teeth are scanned.

The above and other features and advantages of the present invention will be apparent in the following detailed description of the preferred embodiments of the present invention when read in conjunction with the accompanying drawings in which corresponding parts are identified by the same reference symbol.

DESCRIPTION

Figure 1:
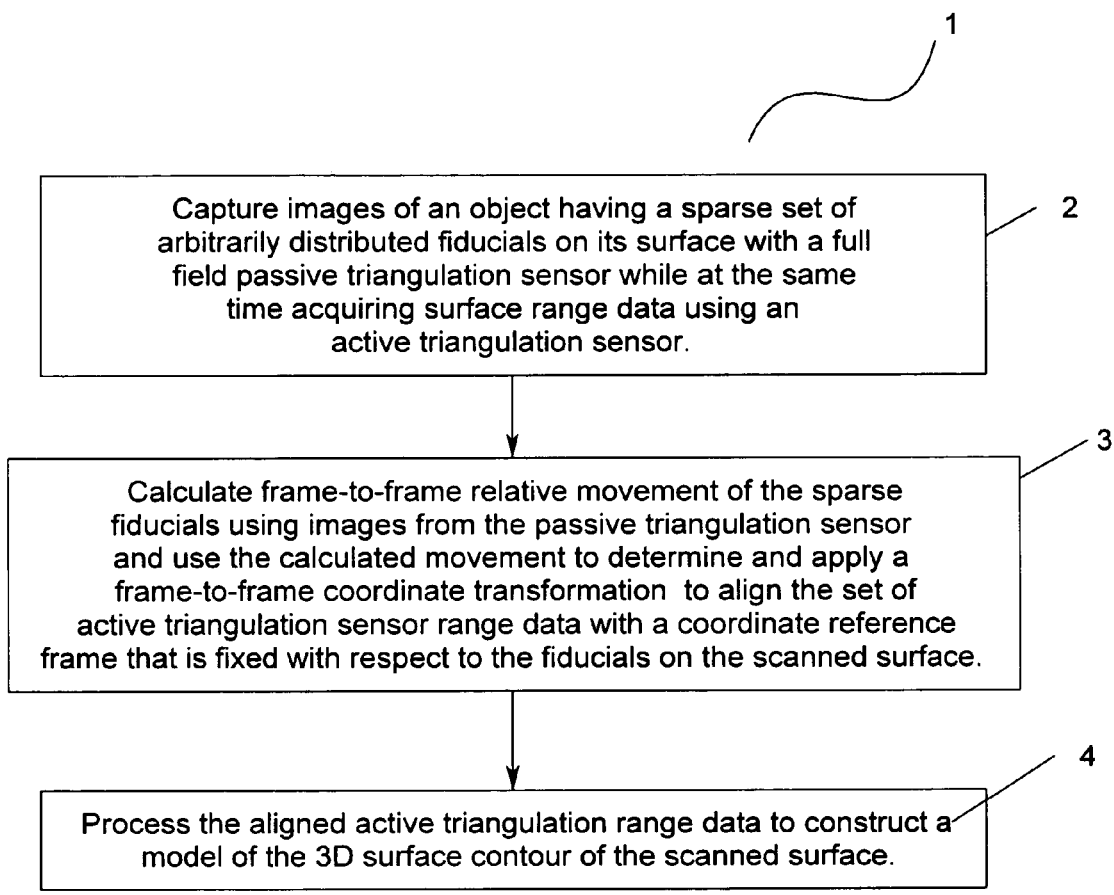
FIG. 1 shows an exemplary process for using image data from a passive triangulation sensor to determine the frame-to-frame alignment of the coordinate reference frame for the image data from an active triangulation sensor.

FIG. 1 shows an exemplary process 1 for creating 3D models of an object such as a tooth. The process captures images of an object having a sparse set of arbitrarily distributed fiducials on its surface with a passive triangulation sensor. At or near the same instant in time that an image is captured by the passive triangulation sensor the process also acquires surface range data using an active triangulation sensor that captures an image of the object's surface (step 2). Next, using the frame-to-frame images of the sparse fiducials from the passive sensor, the process computes the frame-to-frame movement of the sensor with respect to the observed fiducials and determines the coordinate transformations needed to align the active sensor range data taken at each frame. The coordinate transformation is applied in a manner such that the ensemble of active triangulation range data is aligned to a known position and attitude that is fixed with respect to the fiducials on the surface being scanned (step 3). The ensemble of aligned active triangulation range data is used to construct the 3D surface contour of the scanned surface using methods such as tessellation of the range data (step 4).

In one implementation, the method obtains high resolution 3-D surface models of objects with arbitrary motion relative to the imaging system by use of sensor fusion. Sensor fusion is accomplished through a utilization of the passive triangulation sensor to capture images of an object having a sparse set of arbitrarily distributed fiducials on its surface. The high resolution active triangulation sensor uses point, line or 2-D pattern projection to acquire surface range data at or near the same instant in time that an image of the surface fiducials is captured by the passive triangulation sensor. The system utilizes the frame-to-frame relative movement of the sparse fiducials derived from the passive sensor images to determine the required coordinate transformation for accurate registration of the active sensor surface range data with respect to a coordinate reference frame that is fixed with respect to the surface of the object.

Figure 2:
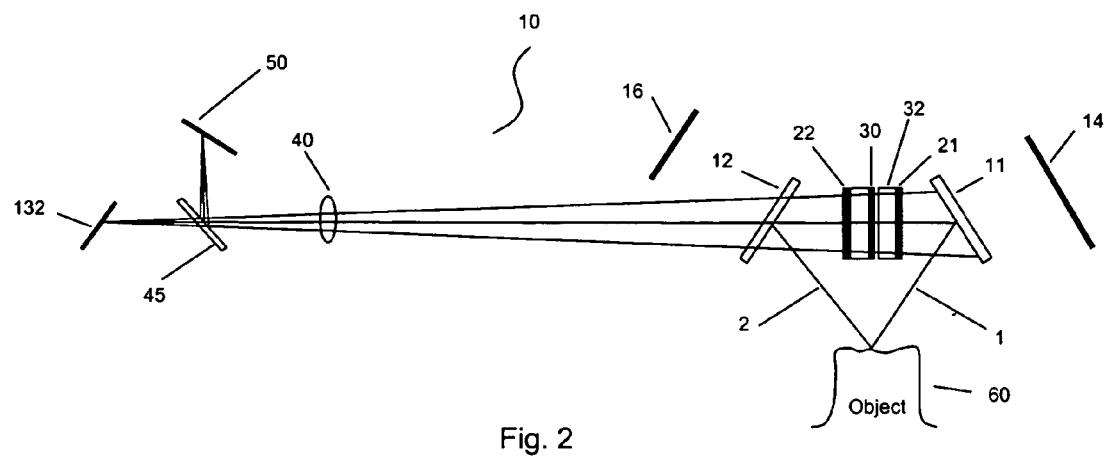
FIG. 2 shows an embodiment of a polarizing multiplexer used to simultaneously gather images of an object from two perspectives and direct the captured images to two camera imagers.

FIG. 2 shows an embodiment of a polarizing multiplexer 10. In FIG. 2, Arm-1 1 allows un-polarized light from an illuminated object 60 to be delivered incident on a Polarizing Beam Splitter (PBS-1) 11, which can be a Wire Grid Polarizer (WGP) or a dielectric plate polarizer or a PBS cube polarizer, among others.

The WGP can be an array of thin parallel conductors supported by a dielectric substrate or a transparent substrate. When the grid spacing (g) is much shorter than the wavelength, the grid functions as a polarizer that reflects electromagnetic radiation polarized parallel ("s-polarity") to the grid, and transmits radiation of the orthogonal polarization ("p-polarity"). The WGP reflects light with its electric field vector parallel ("s-polarity") to the wires of the grid, and transmit light with its electric field vector perpendicular ("p-polarity") to the wires of the grid, but the plane of incidence may or may not be perpendicular to the wires of the grid. The WGP functions as a mirror for one polarization of light, such as the s polarity light, and is transparent for the other polarization, such as the p-polarity light.

In one embodiment, light coming from the object 60 along Arm-1 1 is split 50/50 (3 dB loss) by the PBS-1 11 with the reflected light being substantially s-polarity linearly polarized, and the transmitted light being substantially p-polarity linearly polarized. The p-polarity light transmitted through PBS-1 11 is directed to a beam dump 14 or equivalent, which serves to absorb the p-polarity light and thereby eliminates it as a potential source of interference. The s-polarity light reflected by PBS-1 11 then passes through a Quarter-Wave Retarder (QWR-1) 21 with its fast axis oriented at 45 degrees to the axis of linear polarization in a manner which results in a Right-Hand Circularly Polarized (RHCP) beam for the transmitted light exiting the QWR-1 21. The RHCP light is then transmitted through the compensation window 32 and then through the normal incident Beam Splitter (B/S) 30. In this embodiment, the B/S 30 splits the light 50/50 (3 dB loss) whereby it passes 50% of the incident light with its RHCP polarization preserved while it also reflects 50% of the light, with the reflected light having its polarization changed to Left-Hand Circularly Polarized (LHCP). The LHCP light reflected by B/S 30 then passes back through the compensation window and then through the QWR-1 21 which changes the LHCP light to p-polarity linearly polarized light that continues on through the PBS-1 11 and is directed to the beam dump 14, or equivalent where the light is absorbed. The RHCP light passed by B/S 30 then passes through a Quarter-Wave Retarder (QWR-2) 22 with its fast axis oriented to result in the light passing through to exit as p-polarity linearly polarized light. This p-polarity light then efficiently transmits through a Polarizing Beam Splitter (PBS-2) 12 to a lens 40, which images the object 60 onto a camera imager 132 and a camera imager 50. A hot mirror 45 located between the lens 40 and the camera imagers preferentially reflects images at longer wavelengths of light (such as red and near infrared light) to camera imager 50 while letting images at shorter wavelengths of light (such as blue light) transmit through to camera imager 132.

In FIG. 2, Arm-2 2 allows un-polarized light from the illuminated object 60 to fall incident on the Polarizing Beam Splitter (PBS-2) 12, which can be a WGP or a dielectric plate polarizer or a PBS cube. Light is split 50/50 (3 dB loss) with the reflected light being substantially s-polarity linearly polarized, and the transmitted light being substantially p-polarity linearly polarized. The p-polarity light transmitted through PBS-2 12 is directed to a beam dump 16 or equivalent, which serves to absorb the p-polarity light and thereby eliminates it as a potential source of interference. The s-polarity light reflected from PBS-2 12 then passes through the Quarter-Wave Retarder (QWR-2) 22. The retarders 22 and 21 are each comprised of a plate made of a material in which the speed of light through the material depends on the polarization of that light ("birefringent" material). The birefringent material resolves an incident light wave into a slow wave, corresponding to one component of the incident light wave's polarization vector, and a fast wave, corresponding to another, orthogonal component of that wave's polarization vector. The slow wave travels at a slower velocity than, and is therefore retarded relative to, the fast wave. As a result, the wave that emerges from the birefringent material can have a polarization state that differs from that of the wave incident on the material.

The light passes through the QWR-2 22 with its fast axis oriented at 45 degrees to the axis of linear polarization in a manner which results in a left-hand circularly polarized (LHCP) beam. The LHCP light continues on to the normal incident beam splitter (B/S) 30 where 50% of the light (3 dB loss) is reflected by the B/S 30 and 50% (3 dB loss) of the light passes through the beam splitter 30. The light that passes through the B/S 30 has its LHCP preserved and the LHCP light passes through the compensation window 32 and then through the QWR-1 21 which converts the LHCP light to p-polarity linearly polarized light. The p-polarity light then passes through the PBS-1 11 and is directed to the beam dump 14 or equivalent, which serves to absorb the p-polarity light and thereby eliminate it as a potential source of interference. The LHCP light that is reflected off of the B/S 30 has its polarization converted to RHCP and the RHCP light then passes through the Quarter-Wave Retarder (QWR-2) 22 resulting in p-polarity linearly polarized light. This p-polarity light then efficiently transmits through the Polarizing Beam Splitter (PBS-2) 12 to a lens 40 which images the object 60 via the hot mirror 45 onto the camera imager 132 and the camera imager 50.

The polarizing multiplexer 10 is compact in size. Further, the configuration has the advantage of not inadvertently 're-illuminating' the object with any of the leakage light from the losses at the B/S 30 and the polarizing beam splitters 11 and 12. The leakage due to the initial transmission through PBS-1 11 and PBS-2 12 simply continues on through to the beam dumps 14 and 16 or equivalent. The reflected light in Arm-1 1 from the B/S 30 is LHCP due to its reflection. It is then converted to p-polarity by QWR-1 21 and transmits through PBS-1 11 to the beam dump 14 or equivalent. The transmitted light in Arm-2 2 from the B/S 30 is similarly LHCP and is then converted to p-polarity by QWR-1 21, which also transmits through PBS-1 11 to the beam dump 14 or equivalent.

In one embodiment, the two arms have substantially identical optical path lengths from the object plane to the shared imaging lens 40. Since the light propagating through Arm-2 2 passes twice through the beam splitter 30, which has a finite thickness, an equivalently thick compensating window 32 is required in the path of Arm-1 11 so that the optical path lengths are matched between the two arms. Light traveling through the multiplexer incurs a 3 dB loss each way for a total of 6 dB loss when compared with the nominal 3 dB anticipated from combining the un-polarized light from two spectrally identical objects.

The incorporation of the hot mirror 45 in the optical path provides a means for camera imagers 132 and 50 to simultaneously receive multiplexed images of the object 60. In one embodiment the passive triangulation sensor utilizes a general illumination of the object with light in the shorter wavelength region of the visible spectrum, such as blue light, while the active triangulation sensor simultaneously illuminates the object with a structured light in the longer wavelength region of the visible spectrum, such as red light. The object images from both sources of illumination travels together through the polarizing multiplexer 10 until they reach the hot mirror 45 at which point the image from the passive sensor's blue light illumination of the object is transmitted through the hot mirror 45 to camera imager 132 while the image from the active sensor's red structured light illumination of the object is reflected by the hot mirror 45 to camera imager 50. While this embodiment describes the use of blue light and red light for the illumination of the object, alternative embodiments could use other colors in the light spectrum to achieve the separation of the passive sensor and active sensor images.

Figure 3:
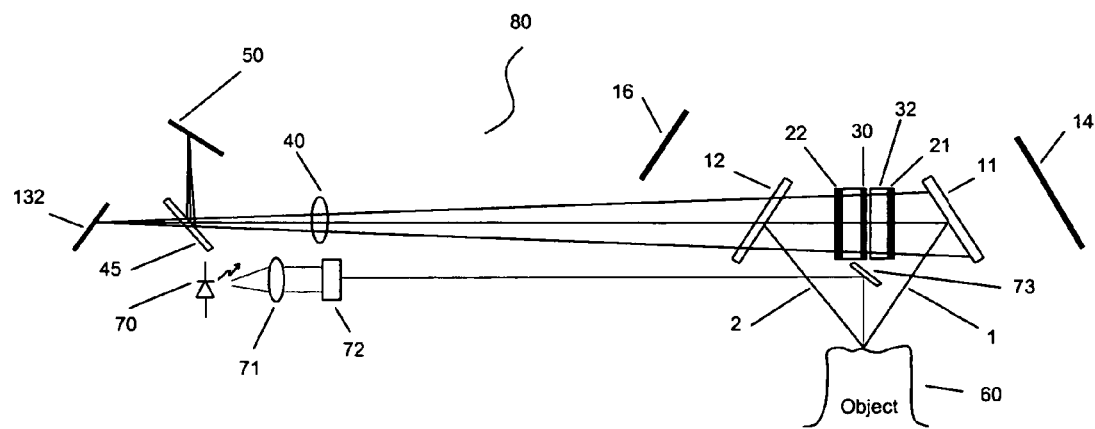
FIG. 3 shows an exemplary dental scanner head with the polarizing multiplexer of FIG. 2.

FIG. 3 shows an exemplary dental scanner head 80 that uses the polarizing multiplexer 10 shown in FIG. 2. The scanner head acquires full field images of fiducials located on the surface of teeth and tissue by broadly illuminating the surface of the teeth and tissue with a generally uniform illumination of short wavelength light, such as blue light, and collecting the full field images of the illuminated surface with the camera imager 132.

At or near the same instance in time of the capture of the full field images by the passive triangulation sensor, the scanner head uses active triangulation to acquire teeth surface range data by imaging the profile created by the intersection of a sheet of red laser light with the surface of the teeth from an angle offset from the laser sheet. In one embodiment, the sensor head includes a single dental scanner head assembly 80 which projects a laser sheet onto the dentition and then utilizes the polarizing multiplexer 10 to optically combine multiple views of the teeth surface profile illuminated by the sheet of laser light. The light from the structured light illumination of the teeth and tissue is reflected by the hot mirror 45 and collected by the profile camera imager 50. The scanner head 80 uses a laser diode 70 to create a laser beam that passes through a collimating lens 71, which is followed by a sheet generator lens 72 that converts the beam of laser light into a sheet of laser light. The sheet of laser light is reflected by the folding mirror 73 in a manner such that the sheet of laser light illuminates the surface of the tooth or other object being scanned.

In a second embodiment, the scanner system comprises two or more corresponding dental scanner heads that are integrated into a common intra oral probe body. For example, in a two scanner head system one scanner head may be used to capture lingual passive triangulation images and lingual active triangulation image profiles of the teeth and tissue while a second scanner head is used to simultaneously capture buccal passive triangulation images and buccal active triangulation image profiles of the teeth and tissue. Each scanner head 80 uses the multiplexer 10 to combine a proximal and distal view of the profile illuminated by the scanner head's laser light and collect the active triangulation sensor profile image with the camera imager 50 while at the same time, the same multiplexer 10 is used to combine proximal and distal full field views of the surface fiducials illuminated by the short wavelength light utilized by the passive triangulation sensor and collect the full field images of the fiducials with the camera imager 132.

Figure 4:
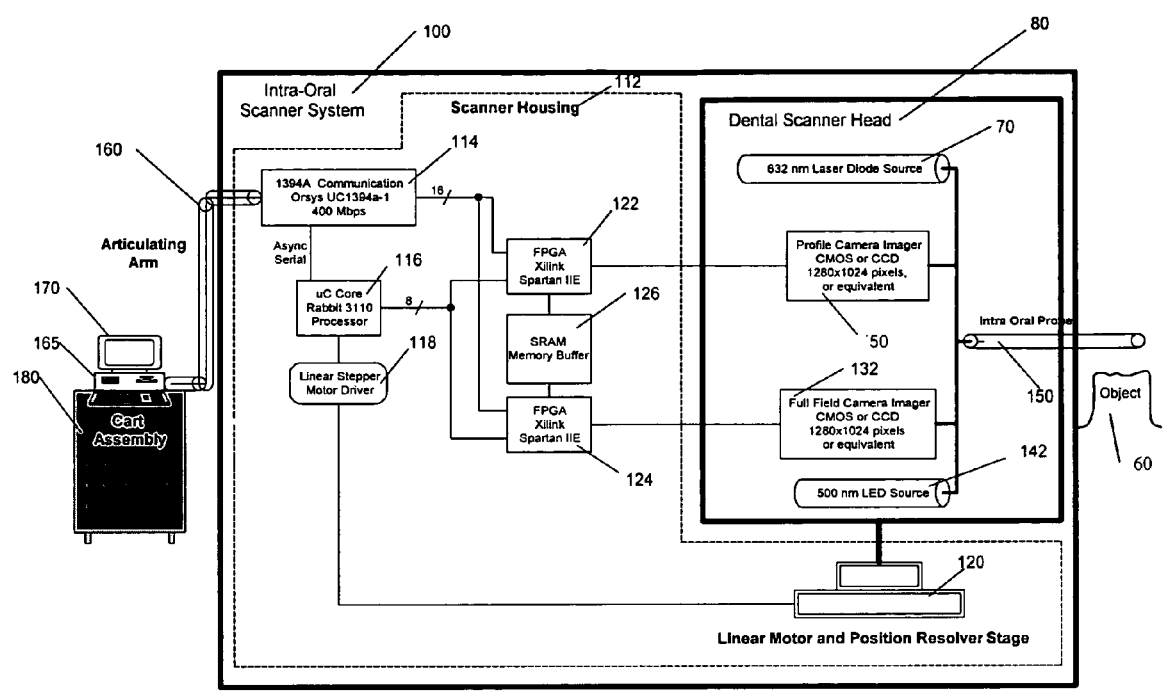
FIG. 4 shows an exemplary 3D scanner.

Turning now to FIG. 4, an intra-oral scanner system 100 is shown. In one embodiment the scanner system 100 is mounted on the end of an articulating arm 160 the other end of the articulating arm 160 is attached to a cart assembly 180. The output of the scanner system 100 communicates with a computer 165 and display 170. The scanner 100 captures images through the dental scanner head 80. The active triangulation profile camera imager 50 may be a commercially available CMOS or CCD sensor. The passive triangulation sensor full field camera imager 132 may be a commercially available CMOS or CCD sensor. In one embodiment, the laser diode source 70 provides laser light with a wavelength of 632 nanometers for the structured light illumination used by the profile camera imager 50 while the LED source 142 provides a blue green light with a wavelength of 500 nanometers for the general illumination used by the full field camera imager 132. The light from the LED source 142 may be coupled to the distal end of the intra-oral probe 150 through a light pipe such as a fiber optic cable. At the distal end of the intra-oral probe 150, the light pipe may be terminated with a lens that distributes the light from the LED source over a broad region of the teeth and tissue surfaces that are within the field of view of the full field camera imager 132. The intra-oral optical probe 150 contains the passive optical components (shown in FIG. 3) of the dental scanner head 80 such as the lens 40, 71 and 72, the hot mirror 45, the PBS's 11 and 12, the QWR's 21 and 22, the beam splitter 30, the compensating window 32 and the folding mirror 73. The intra-oral optical probe 150 employs the polarizing multiplexer 10 (not shown) to obtain views from two different perspectives of 1) the profile of the laser illumination on the object 60 for the profile camera imager 50; and 2) the full field images of the LED 142 illumination of the fiducials distributed on the surface of the object 60 for the full field camera imager 132. In an alternative embodiment the laser source 70 is also packaged with-in the intra oral optical probe 150.

The scanner system 100 has a scanner housing 112 that contains a communications link such as an IEEE 1394 link 114. The link 114 communicates with a processor 116, which in turn controls a motor driver 118 that can be a linear stepper motor driver. The motor driver 118 in turn actuates a motor stage 120 to move the intra-oral end of the dental scanner head 80 across the dental structures within the intra-oral cavity. The processor 116 also communicates with custom electronics such as a field programmable gate array (FPGA) 122 and FPGA 124 as well as a memory buffer 126. The gate array 122 communicates with the profile camera imager 50. The laser light source 70 provides light to the intra oral optical probe 150 for structured light illumination of the dental surface being scanned. The gate array 124 communicates with the full field camera imager 132. The LED light source 142 provides light to the intra oral optical probe 150 for generally uniform illumination of the dental surface being scanned.

In one embodiment, the patient's teeth are coated with a fluorescent-based coating. U.S. Pat. No. 6,592,371 titled Method and System for Imaging and Modeling A Three Dimensional Structure by Durbin et al, describes the use of a fluorescent material to coat a surface before scanning and is incorporated herein. The coating may also contain generally spherical particles such as polystyrene beads or carbon beads to serve as fiducials on the surface of the object being scanned. The particles may have a nominal diameter that ranges in size from less than 10 µm to greater than 200 µm with a preferred diameter of 25 µm to 50 µm. The concentration of particles in the coating may vary over a range from 0.01% to 2% by volume but preferably the particle concentration is such that final distribution of particle fiducials on the coated teeth and tissue surface is in the range of 0.5 to 4 particle fiducials per square millimeter of coated surface. In this embodiment, the active triangulation profile camera imager 50 would acquire a slice of surface image data every 25 to 100 µm by using the light source 70 such as a 632 nm laser diode source to excite the fluorescent coating with a line pattern and then measuring the returned fluorescent signal as viewed by the camera imager 50 from two perspectives through the polarizing multiplexer 10 contained in the intra-oral optical probe 150. At or near the same instant in time that the profile camera imager 50 captures a slice of the surface for the profile image, the full field camera imager 132 would acquire a corresponding full field view of the particle fiducials on the coated surface surrounding the slice of the surface by using the light source 142 such as a 500 nm LED source to illuminate the fiducials that were applied with the coating and then viewing the images of the illuminated fiducials with the camera imager 132 from two perspectives through the polarizing multiplexer 10 contained in the intra-oral optical probe 150.

In one implementation using active triangulation to measure the surface contour of the teeth being scanned, the linear motor and position resolver stage 120 is used to move the dental scanner head along a linear or curvilinear path across one or more of the patient's teeth while the laser source 70 is used to illuminate the patient's teeth with a line pattern and the profile image camera 50 collects a series of profile images at a rate such that the captured surface image slices are nominally 25 to 100 µm apart. As an alternative to the laser line pattern for the active triangulation illumination, a laser light dot or a laser light two dimensional pattern may be be used for the active triangulation illumination. A set of corresponding full field images of the fiducials applied with the coating on the surface of the object would be obtained by synchronously illuminating the teeth and tissue with light from the LED source 142 and collecting two views of the illuminated particle fiducials with the full field camera imager 132. In this manner, each active triangulation profile image slice collected by the profile camera imager will have a corresponding full field stereo image of the fiducials on the surface of the teeth and tissues in the immediate vicinity of the slice of tooth surface.

In one embodiment of the intra oral scanner that is configured to use a single dental scanner head 80, the user or operator performs the following steps to obtain an optical impression. The operator first coats one or more of the patient's teeth with a fluorescent-based coating that contains particles sized over a nominal range of 25 to 50 µm. The operator then grasps the body of the intra-oral scanner 100, which is attached to the articulating arm 160, and positions the intra-oral optical probe 150 into the patient's oral cavity such that it is oriented to view and capture the buccal side of the coated dentition. Once the intra-oral optical probe 150 is properly positioned, the operator releases their hold on the body of the scanner and the articulating arm 160 then holds the scanner's intra-oral optical probe 150 steady at the released position. The linear motor and position resolver stage 120, which drives the dental scanner head 80, moves the dental scanner head 80 along a linear or curvilinear path of 5 to 100 millimeters, but typically 40 to 50 millimeters, on the buccal side of the coated dentition while the scanner system captures profile images and full field images of the observed dentition every 25 to 40 µm of linear or curvilinear travel. During the buccal scan, the profile image capture for the camera imager 50 is controlled by the field programmable gate array (FPGA) 122 and the full field image capture for the full field imager 132 is controlled by the FPGA 124. The FPGA's 122 and 124 are synchronized by the processor 116 and the FPGA's perform the data compression of each image prior to transmission to the host image processor through the IEEE 1394 interface 114. Upon completion of the buccal scan, the operator would then grasp the body of the scanner 100 and reposition the intra-oral optical probe 150 to the lingual side of the coated dentition and orient the intra-oral optical probe to view the coated dentition. The operator would then release his or her hold on the body of the scanner and the lingual scan profile images and full field images would be captured using the same process as described above for the buccal scan. In one embodiment, a bite block incorporated into the outer shell of the housing for the intra oral optical probe 150 can be used in conjunction with the scanner system 100 to constrain and minimize the extent of relative motion between the patient's teeth and the dental scanner head 80 during a scan. At the conclusion of the lingual scan, the buccal and lingual profile image scan data would be combined by the image processor hosted in the computer 165 to create a 3D model of the scanned teeth for display to the user on the display 170.

The image processing for each frame of the active triangulation profile image scan data would include level thresholding, determination of the beam center and computing the y and z coordinates (in the coordinate reference frame of the scanner) for the surface range data using active triangulation analysis. The x coordinate (again in the coordinate reference frame of the scanner) for each profile image scan would be obtained from the position resolver contained with the linear motor and position resolver stage 120. The preliminary surface range map corresponding to each imaged slice of the surface contour of the scanned dentition would then be created by assigning y and z coordinates determined from the profile image with the position resolver's 120 measured x-direction value that corresponds to the instant in time that the profile image data frame was captured.

Because the surface of the teeth may move with respect to the scanner between each image frame in the set of active triangulation image profiles, the ego-motion data derived from the full field images is used to determine the set of coordinate transformation matrices that align each slice of the active triangulation surface range data to a coordinate reference frame that is fixed with respect to the teeth being scanned.

Figure 5:
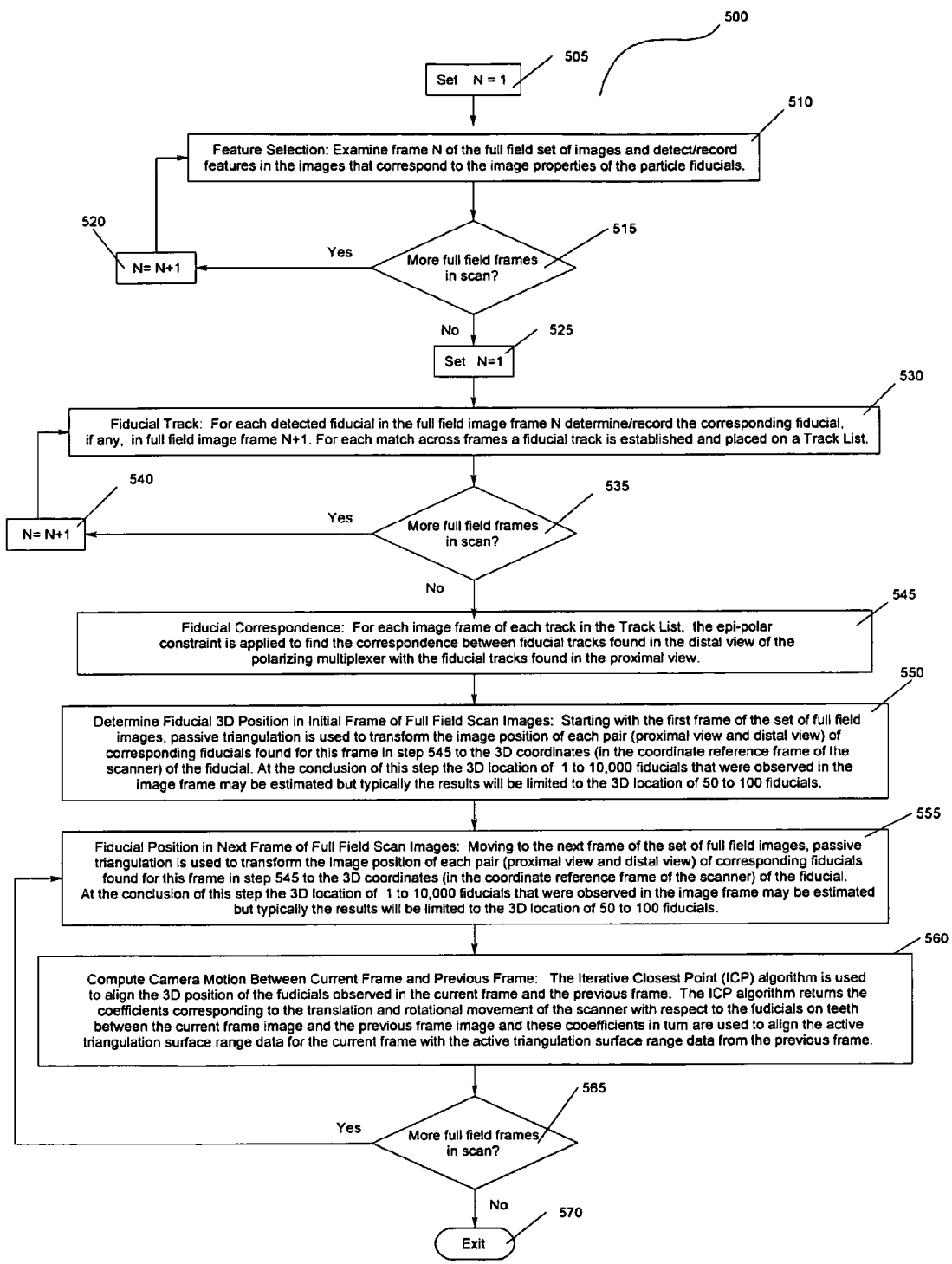
FIG. 5 shows an exemplary process for computing the ego-motion of the passive triangulation sensor with respect to a coordinate reference frame fixed to a set of fiducials located on the teeth being scanned.

FIG. 5 shows an exemplary process 500 for using the full field images of the fiducials on the scanned surface to perform the ego-motion computation. The process starts by setting a counter N to 1 (step 505). The process next performs feature selection by examining the first image frame from the full field camera and detecting and recording the position of features in the image that have the image properties expected of the fiducial particles (step 510). The process then checks whether there are additional full field image frames in the scan (step 515) and if so, the counter N is incremented (step 520) and the feature selection process (step 510) is performed on the next frame of the scan. Once all of the full field frames for the scan are processed through the feature selection the step 515 decision returns a No and the counter N is reset to 1 (step 525).

The process 500 continues by tracking each detected fiducial across successive pairs of image frames to establish a track for each fiducial (step 530). Typically the track of a fiducial from the current image frame to the next image frame is performed by projecting the estimated current image velocity of the fiducial to derive an expected position of the fiducial in the succeeding image frame. A search is then performed around the expected fiducial location in the succeeding image frame and the fiducial found closest to the expected location is identified as the tracking match. This process is continued for each of the fiducials detected in the current image frame. If a current image frame fiducial cannot be matched with a fiducial in the following image frame, the track for that fiducial is terminated. Once the track matching is completed for all detected fiducials across frame N and frame N+1, the process 500 checks whether there is another full field frame of data to be processed step (535). If so, the counter N is incremented (step 540) and the fiducial track process continues with the next frame of full field image data from the scan. A track list is used to record the tracks found for each fiducial across the set of all the full field images from the scan.

Once all of the full field frames for the scan are processed through the fiducial track process, the step 535 decision returns a No and the process 500 now determines the fiducial correspondence between the proximal and distal views of the full field stereo images (step 545). Fiducial correspondence consists of establishing which fiducial observed in the proximal view of the full field camera imager corresponds to the image of the same fiducial observed in the distal view of the full field camera imager. For camera imagers configured for a stereo view such as that provided by the polarizing multiplexer, the epipolar constraint confines the image of a fiducial in the distal view to lie along a line in the distal image that is established by the observed position of the fiducial imaged in the proximal view. By successively applying the epipolar constraint between the fiducial tracks for the distal view and the fiducial tracks for the proximal view, an ensemble of fiducial correspondences is found in step 545 across the complete set of full field images captured during the scan.

Taking the fiducial correspondences found in step 545 for the first frame of the full field image, passive triangulation is used to transform the image position of each pair (proximal view and distal view) of corresponding fiducials found for the image frame to the 3D coordinates (in the coordinate reference frame of the scanner) of the fiducial (step 550). At the conclusion of step 550, the 3D locations of 1 to 10,000 fiducials that were observed in the image frame may be computed but typically the results for a frame will be limited to the 3D location of 50 to 100 fiducials.

Again taking the fiducial correspondences found in step 545, the process 500 moves to the next image frame from the full field camera imager and passive triangulation is used to transform the image position of each pair (proximal view and distal view) of corresponding fiducials found for this next image frame to the 3D coordinates (in the coordinate reference frame of the scanner) of the fiducial (step 555).

The process 500 next takes the fiducial 3D positions determined in step 550 and step 555 and uses the iterative closest point (ICP) algorithm to compute the scanner motion between frames, specifically, the scanner motion with respect to the imaged fiducials on the surface being scanned (step 560). The ICP algorithm is an established technique in 3D processing that takes a set of points in coordinate reference frame 1 and then iteratively translates and rotates the coordinate reference frame to find the position that closely matches the set of points to their corresponding points in a coordinate reference frame 2. The result of the ICP algorithm is a matrix of coordinate reference frame translation and rotation coefficients that are then used to align the active triangulation surface range data for the current frame with the active triangulation surface range data from the previous frame (step 560).

The process 500 next checks whether there is another frame of full field image data to be processed (step 565) and if Yes, the process loops back to calculate the fiducial 3D positions in this next frame of full field image data (step 555) and then computes the scanner motion between this next frame and the previous frame. Once all of the full field image frames for the scan are processed through step 555 and the coordinate transformation coefficients are computed for aligning all of the frames of active triangulation surface range data at step 560, the decision at step 565 returns a No and the ego-motion computation process exits (step 570).

The process shown in FIG. 5 reflects a discrete-time method of ego-motion computation. As illustrated in FIG. 5 this method is based upon the displacement from one frame to the next of observed fiducial positions in the stereo images captured by the passive triangulation senor. The stereo view allows the calculation of a fiducial's 3D position from a single frame of image data and the displacement of the fiducial's 3D position from one image frame to the next image frame is used to compute the camera motion from one frame to the next.

An alternative ego-motion computation method that may be used is categorized as an instantaneous-time algorithm. This alternative method does not depend upon a stereo view in a single image frame but rather is based upon the computation of the image velocity across a sequence of image frames. For a scene comprised of a rigid body, the image velocity due to motion of a camera capturing images of the scene is given by the following equation that is well known to those familiar with the art:

$$u(x) = \begin{bmatrix} 1 & 0 & -x_1 \\ 0 & 1 & -x_2 \end{bmatrix} * \left( \frac{T}{Z(x)} + \Omega \times X \right)$$

where $u(x)$ is the image velocity at image position $x = (x_1, x_2, 1)^t$, T is the translational velocity, $\Omega$ is the rotational velocity, and Z is the depth. For this method of ego-motion computation the problem becomes one of estimating the 3D motion of the camera, T and $\Omega$, from the collection of the full field images of the fiducials across all of the frames of the scan. Typically solving for T and Ω involves an iterative process of estimating the motion and then comparing the projected image positions of the ensemble of fiducials derived from the estimated motion with the observed actual image positions of the fiducials. The iteration continues until a minimum error between the projected image positions and the observed image positions is achieved and the estimated motion corresponding to this minimum error is taken as the computed ego-motion. While the method shown in FIG. 5 is the preferred method for ego-motion computation, the alternative instantaneous-time method of ego-motion computation may also be used by this invention, particularly when the geometry of the scanner and the object are such that there is significant obscurations between the full field imager's proximal and distal views that limit the number of stereo views of fiducials in an image frame.

Referring again to FIG. 4, in one embodiment, the cart assembly 180 is connected to the scanner 100 through the articulating arm 160 extending from the cart 180. The scanner housing 112 attaches to the arm 160 through a wrist-joint interface that allows the scanner 100 to be rotated about its pitch, yaw and row axis. In an alternative embodiment, the articulating arm may be eliminated and the scanner body may be held and supported by the user both during the placement of the intra-oral probe into the patient's oral cavity and during the scan of the dentition. The body of the housing 112 serves as a grip for the user to grasp and maneuver the scanner 100 to position and hold the probe head 150 for a scan.

The 3D model produced by the system described above can be automatically fused and displayed with other 3D images such as CT, MR or any other imaging that provides a 3D data set. Thus, if the patient's anatomy is known relative to a fixed reference, the model generated by the probe can be displayed so that it automatically correlates with an imaging database for display purposes.

In one embodiment, the patient's teeth are coated with a fluorescent-based coating. The profile sensor 50 would acquire a slice of surface image data every 25 to 40 µm using a suitable light source such as a 632 nm (red) laser diode source to excite the fluorescent coating and then the sensor 50 would measure the returned fluorescent signal. The imaged area for the full field camera imager can be illuminated by a 500 nm (blue) LED to increase contrast.

The full field image captures a sparse set of distinguishable features (in one embodiment approximately 50 features in an individual frame) on the tooth surface that are used to provide frame-to-frame registration information for the active triangulation sensor's profile images based upon the application of ego-motion computation to derive an estimate of the full field camera imager's movement with respect to the fiducials observed on the surface of the teeth and tissue being scanned. The distinguishable features can be either naturally occurring such as prominent occlusal features of the dentition or they can be synthetic fiducials such as small carbon, latex or polystyrene spheres (preferably 25 to 50 µm in diameter) and introduced with the application of the coating.

When using synthetic fiducials, due to the total image area of the full field camera imager, individual fiducials can typically be tracked across several hundred frames of the full field imager. This provides the information needed to align the active triangulation sensor's surface range data profiles captured at each frame with a coordinate reference frame that is fixed to the fiducials on the scanned surface and thereby accommodate frame to frame movement of the patient's teeth with respect to the scanner intra-oral probe.

In one implementation, the 3D imaging system uses a passive triangulation sensor that captures full field images of an object's surface at frame rates that range between 2 and 1000 frames per second. The frame rate is typically between 40 and 120 frames per second. In conjunction with the passive triangulation sensor, an active triangulation sensor is used in projecting one of a point, a line or 2D pattern onto an object. In one embodiment, the active sensor projects a structured light laser line bisecting the volume to be captured by the passive sensor. The active sensor is run at the same frame rate and in synchronicity with the passive sensor such that each of the image frames captured by the active triangulation sensor is captured at, or near the same instant in time as each image frame is captured by the passive triangulation sensor. The combined sensor system is mounted on a platform that is either fixed or mobile but more commonly mobile such as the cart assembly 180. For objects lacking sufficient distinct physical characteristics that can be used as fiducials, a coating is used to apply 0.5 to 10,000 fiducials per square millimeter onto the surface of the object. The fiducials may be applied on the surface with an arbitrary distribution. The determination of the per image frame coordinate transformation required to align the active sensor surface range data with a coordinate reference frame that is fixed with respect to the surface of the object being scanned is determined using the fiducials captured by the passive sensor and the technique known as ego-motion computation.

The invention has been described in terms of specific examples which are illustrative only and are not to be construed as limiting. The invention may be implemented in optics and opto-electronics, digital electronic circuitry or in computer hardware, firmware, software, or in combinations of them.

Apparatus of the system for evaluating treatment outcome may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially designed application-specific integrated circuits (ASICs) or suitably programmed field programmable gate arrays (FPGAs).

The scanner system algorithms can be implemented as software. Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Portions of the system and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The present invention has been described in terms of specific embodiments, which are illustrative of the invention and not to be construed as limiting. Other embodiments are within the scope of the following claims. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A scanner, comprising: a passive triangulation sensor; and an active triangulation sensor coupled to the passive triangulation sensor in synchronicity to obtain a high resolution 3D surface model from an object undergoing arbitrary motion during image acquisition, wherein the active triangulation sensor and the passive triangulation sensor run at a predetermined frame rate and wherein corresponding image frames captured by the active triangulation sensor and the passive triangulation sensor are synchronously captured at approximately the same time.

2. The scanner of claim 1, wherein the passive triangulation sensor comprises a full field passive sensor that captures images of a sparse set of arbitrarily distributed fiducials on the surface of the object.

3. The scanner of claim 1, wherein the active sensor projects a pattern bisecting the object.

4. The scanner of claim 3, wherein the pattern comprises one of: a point, a line, a 2D pattern.

5. The scanner of claim 1, wherein the sensors scan at frame rates between 2 and 1000 frames per second.

6. The scanner of claim 1, wherein the sensors are mounted on a fixed or mobile platform.

7. The scanner of claim 1, comprising a plurality of fiducials distributed on the object to determine per frame coordinate transformations to accommodate for between frame motion and to align the active triangulation sensor surface range data information with a coordinate reference frame that is fixed with respect to the surface of the object.

8. The scanner of claim 7, wherein the fiducials comprise a sparse distribution with less than 10,000 fiducials per square millimeter.

9. The scanner of claim 7, wherein images of the fiducials are processed using an ego-motion computation technique.

10. A method for forming 3-D surface models of an object with arbitrary motion relative to an imaging system, comprising: capturing images of an object having a sparse set of arbitrarily distributed fiducials on its surface with a passive triangulation sensor; acquiring surface range data using an active triangulation sensor in synchronicity with the passive triangulation sensor, wherein the active triangulation sensor and the passive triangulation sensor run at a predetermined frame rate and wherein corresponding image frames captured by the active triangulation sensor and the passive triangulation sensor are synchronously captured at approximately the same time; and using frame-to-frame relative movement of the imaged fiducials from the passive triangulation sensor to determine a coordinate transformation that aligns the active triangulation sensor surface range data with a coordinate reference frame fixed to the object.

11. The method of claim 10, wherein the passive triangulation sensor comprises a full field passive sensor that captures images of a sparse set of arbitrarily distributed fiducials.

12. The method of claim 10, wherein the active sensor projects a pattern bisecting the object.

13. The method of claim 12, wherein the pattern comprises one of: a point, a line, a 2D pattern.

14. The method of claim 10, wherein the sensors scan at frame rates between 2 and 1000 frames per second.

15. The method of claim 10, wherein the sensors are mounted on a fixed or mobile platform.

16. The method of claim 10, comprising applying a plurality of fiducials on the object to determine per frame coordinate transformation to accommodate for between frame motion and to align the active sensor surface range data information with a coordinate reference frame that is fixed with respect to the surface of the object.

17. The method of claim 16, wherein the applied fiducials have a distribution on the object's surface less than approximately 10,000 fiducials per square millimeter.

18. The method of claim 16, comprising processing fiducial image data using an ego-motion computation technique.

* * * * *